United States Patent
Nakada et al.

(10) Patent No.: US 12,409,572 B2
(45) Date of Patent: Sep. 9, 2025

(54) SAFETY VISION DEVICE, AND SAFETY VISION SYSTEM

(71) Applicant: FANUC CORPORATION, Yamanashi (JP)

(72) Inventors: Youhei Nakada, Yamanashi (JP); Takeshi Motodaka, Tokyo (JP)

(73) Assignee: FANUC CORPORATION, Yamanashi (JP)

( * ) Notice: Subject to any disclaimer, the term of this patent is extended or adjusted under 35 U.S.C. 154(b) by 163 days.

(21) Appl. No.: 18/038,807

(22) PCT Filed: Dec. 14, 2021

(86) PCT No.: PCT/JP2021/046118
§ 371 (c)(1),
(2) Date: May 25, 2023

(87) PCT Pub. No.: WO2022/138340
PCT Pub. Date: Jun. 30, 2022

(65) Prior Publication Data
US 2023/0415363 A1 Dec. 28, 2023

(30) Foreign Application Priority Data
Dec. 21, 2020 (JP) ................................ 2020-211721

(51) Int. Cl.
*B25J 19/06* (2006.01)
*G06T 7/246* (2017.01)
(Continued)

(52) U.S. Cl.
CPC ............. *B25J 19/061* (2013.01); *G06T 7/251* (2017.01); *G06T 7/62* (2017.01); *G06T 7/80* (2017.01); *G06T 2207/30196* (2013.01)

(58) Field of Classification Search
None
See application file for complete search history.

(56) References Cited

U.S. PATENT DOCUMENTS 10,929,654 B2 * 2/2021 Iqbal .................... G06N 3/08
12,182,197 B2 * 12/2024 Yoshida ............... G06F 16/532
(Continued)

FOREIGN PATENT DOCUMENTS

CN 101511550 A 8/2009
CN 104476544 4/2015
(Continued)

OTHER PUBLICATIONS

International Search Report issued Mar. 1, 2022 in corresponding International Application No. PCT/JP2021/046118.
(Continued)

*Primary Examiner* — Khoi H Tran
*Assistant Examiner* — Dairon Estevez
(74) *Attorney, Agent, or Firm* — Wenderoth, Lind & Ponack, L.L.P.

(57) ABSTRACT

A robot decelerates or stops, without using an area sensor, when a worker enters a robot operating area. The safety vision device includes a human three-dimensional skeleton estimation model, a robot three-dimensional skeleton estimation model, an input unit for inputting a two-dimensional image of a worker and a robot captured by an external camera, and a distance and a tilt between the camera and the robot, an estimation unit that inputs, to the models, the two-dimensional image and the distance and tilt, to estimate three-dimensional joint point data indicating the three-dimensional coordinate values of the position of a joint point of the worker, and the angles of a plurality of joint axes included in the robot, and an approach determination unit that calculates a worker area and a robot area, and outputs an instruction to decelerate or stop the robot, depending on the degree of overlap of the areas.

5 Claims, 14 Drawing Sheets

(51) Int. Cl.
  *G06T 7/62*   (2017.01)
  *G06T 7/80*   (2017.01)

(56) References Cited

U.S. PATENT DOCUMENTS

| | | | |
|---|---|---|---|
| 2015/0294496 A1* | 10/2015 | Medasani | G06T 15/205 |
| | | | 345/420 |
| 2019/0105779 A1* | 4/2019 | Einav | B25J 9/1689 |
| 2019/0134819 A1* | 5/2019 | Okahara | B25J 13/088 |
| 2019/0217472 A1* | 7/2019 | Nakasu | B25J 9/1676 |
| 2020/0331155 A1* | 10/2020 | Vu | B25J 19/06 |
| 2021/0065430 A1* | 3/2021 | Le Floch | G06T 7/564 |
| 2024/0033910 A1* | 2/2024 | Nakada | B25J 9/1605 |
| 2024/0303859 A1* | 9/2024 | Nakamura | G06T 7/251 |

FOREIGN PATENT DOCUMENTS

| | | | |
|---|---|---|---|
| CN | 108527370 A | | 9/2018 |
| CN | 110480634 A | * | 11/2019 |
| CN | 111372735 A | | 7/2020 |
| JP | 2004-243427 | | 9/2004 |
| JP | 2020-93373 | | 6/2020 |
| KR | 20200036088 A | * | 4/2020 |

OTHER PUBLICATIONS

Naoki Kato, "Investigation of the latest papers on computer vision 3D Human Pose Estimation", URL:https://engineering.dena.com/blog/2019/12/cv-papers-19-3d-human-pose-estimation/, Published in 2019, with machine translation.

Human3.6M a dataset by Catalin Ionescu, Dragos Papava, Vlad Olaru and Cristian Sminchisescu, URL: http://vision.imar.ro/human3.6m/description.php.

* cited by examiner

FIG. 12
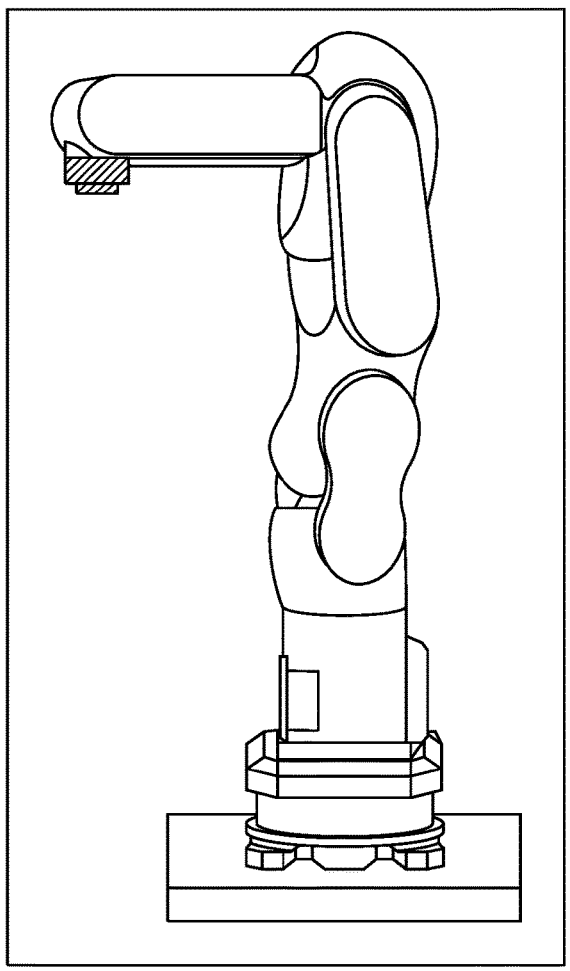
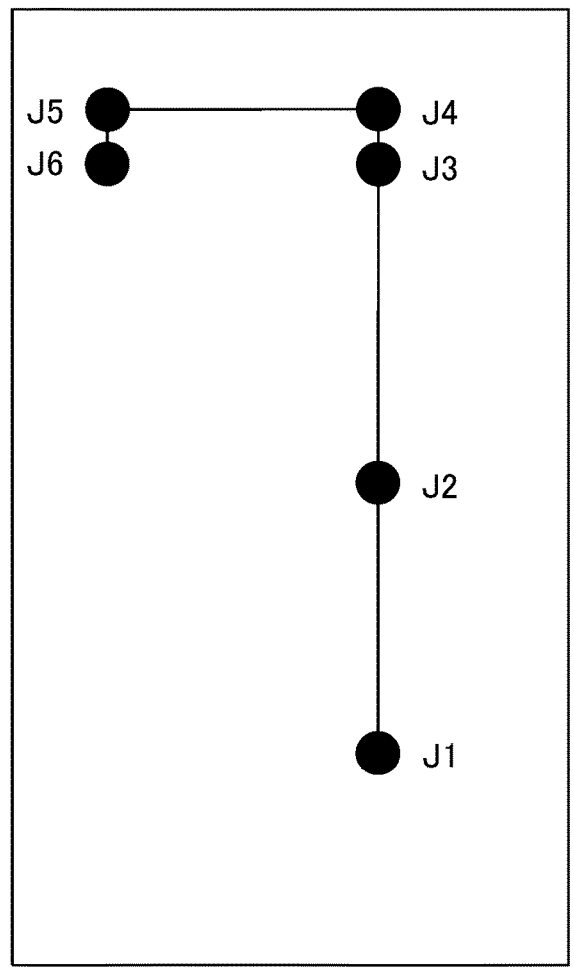

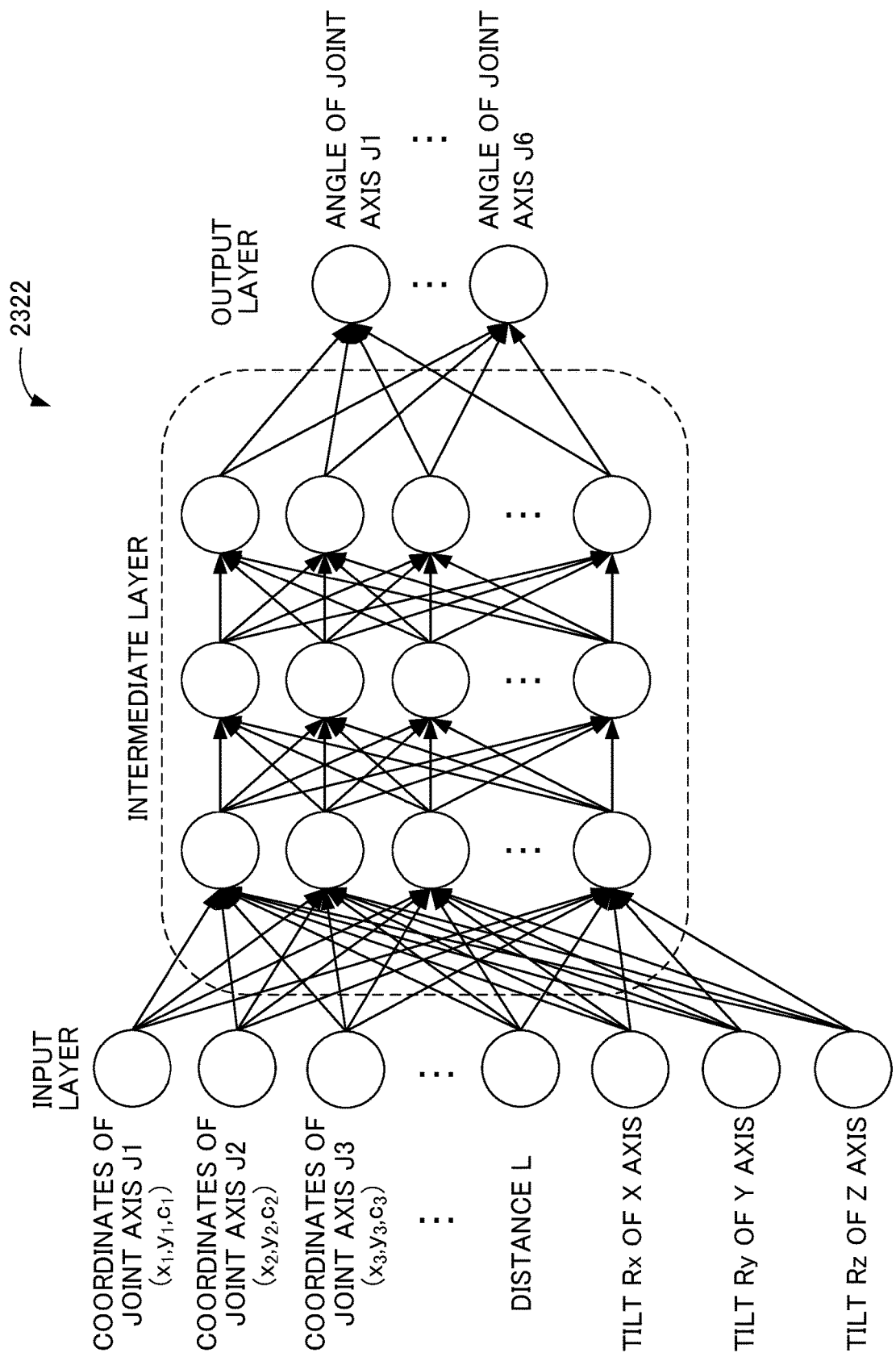

SAFETY VISION DEVICE, AND SAFETY VISION SYSTEM

TECHNICAL FIELD

The present invention relates to a safety vision device and a safety vision system.

BACKGROUND ART

There is known a technology in which, when there is a possibility that a worker, who is a safety monitoring target, enters a motion area of a robot, the motion area of the robot is set around the worker, and safe motion control, emergency stop control and the like, of the robot are performed when the robot enters the motion area. See, for example, Patent Document 1.

Patent Document 1: Japanese Unexamined Patent Application, Publication No. 2004-243427

DISCLOSURE OF THE INVENTION

Problems to be Solved by the Invention

In the conventional technology, in order to detect that the worker has entered the motion area of the robot, an area sensor or the like is used. However, since it is necessary to install the area sensor near the robot, motions and movements of the worker and the robot are restricted.

Therefore, it is desired to, when the worker enters the motion area of the robot, cause the robot to decelerate or stop without using an area sensor.

Means for Solving the Problems (1) An aspect of a safety vision device of the present disclosure comprising: a human three-dimensional skeleton estimation model receiving input of a two-dimensional image of a human, and outputting three-dimensional joint point data indicating three-dimensional coordinate values of positions of joint points of the human; a robot three-dimensional skeleton estimation model receiving input of a two-dimensional image of a robot, and a distance and a tilt between a camera that has captured the two-dimensional image of the robot and the robot, and outputting angles of a plurality of joint axes included in the robot; an input unit configured to input a two-dimensional image of a worker and the robot captured by an external camera, and a distance and a tilt between the external camera and the robot; an estimation unit configured to input the two-dimensional image, and the distance and tilt between the external camera and the robot, which have been inputted by the input unit, to the human three-dimensional skeleton estimation model and the robot three-dimensional skeleton estimation model, and estimate three-dimensional joint point data indicating three-dimensional coordinate values of positions of joint points of the worker and the angles of the plurality of joint axes included in the robot; and an approach determination unit configured to calculate an area indicating a range of the worker and an area indicating a range of the robot, based on the three-dimensional joint point data and the angles of the plurality of joint axes, and output an instruction to decelerate or stop the robot according to a degree of overlap between the calculated areas of the worker and the robot.

(2) An aspect of the safety vision system of the present disclosure comprising a robot; a camera; and the safety vision device of (1).

Effects of the Invention

According to an aspect, it is possible to, when a worker enters a motion area of a robot, cause the robot to decelerate or stop without using an area sensor.

BRIEF DESCRIPTION OF THE DRAWINGS

FIG. 12 is a diagram showing an example of comparison between a frame image and an output result of the two-dimensional estimation model; and FIG. 13 is a diagram showing an example of the joint angle estimation model.

PREFERRED MODE FOR CARRYING OUT THE INVENTION

One embodiment of the present disclosure will be described below using diagrams.

One Embodiment

Figure 1:
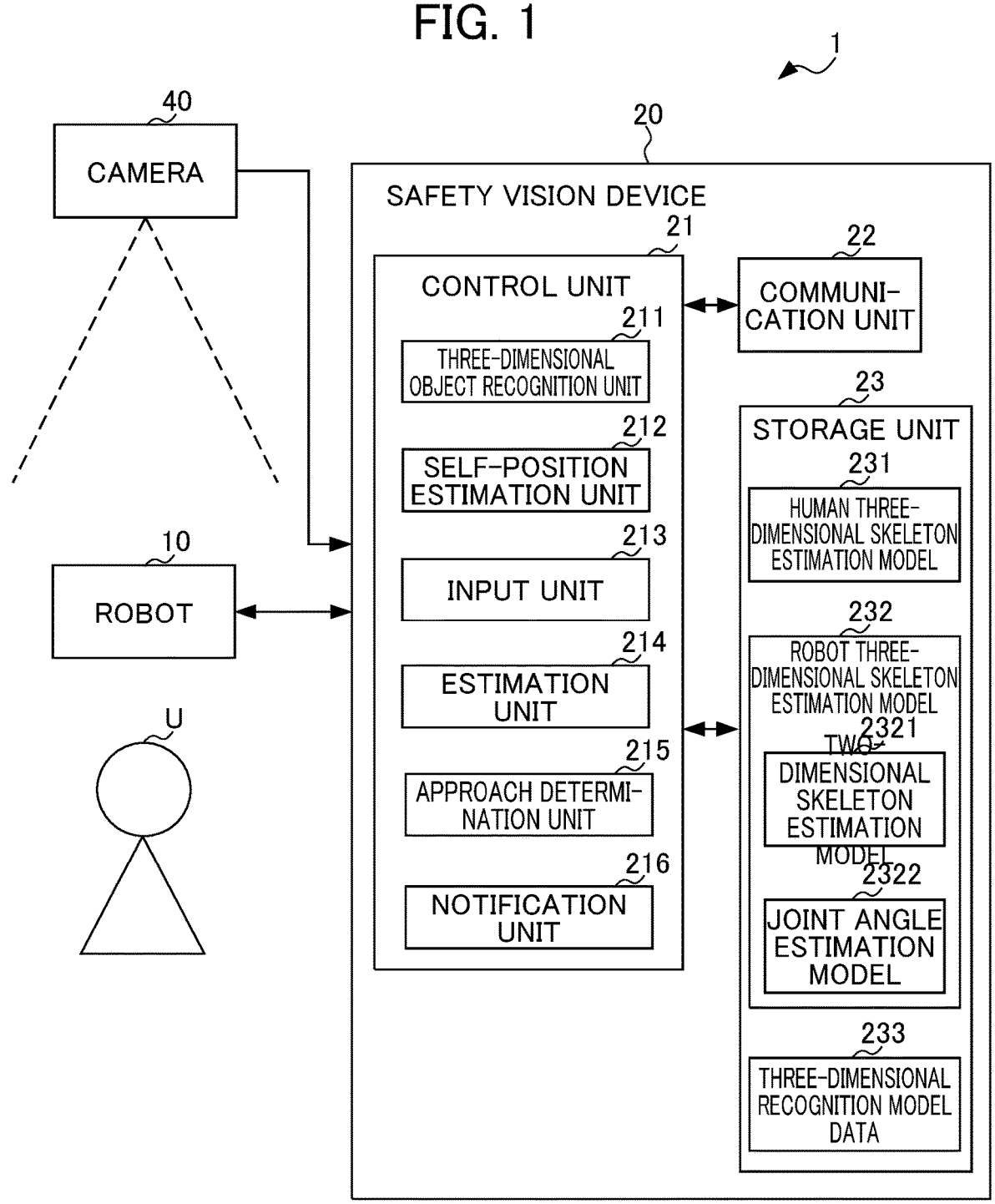
FIG. 1 is a functional block diagram showing a functional configuration example of a safety vision system according to one embodiment.

FIG. 1 is a functional block diagram showing a functional configuration example of a safety vision system according to one embodiment. As shown in FIG. 1, a safety vision system 1 includes a robot 10, a safety vision device 20, and a camera 40.

The robot 10, the safety vision device 20, and the camera 40 as an external camera may be mutually connected via a network not shown such as a wireless LAN (local area network), Wi-Fi (registered trademark), and a mobile phone network conforming to a standard such as 4G or 5G. In this case, the robot 10, the safety vision device 20, and the camera 40 include communication units not shown for mutually performing communication via such connection. Though it has been described that the robot 10 and the safety vision device 20 perform data transmission/reception via the communication units not shown, data transmission/reception may be performed via a robot control device (not shown) that controls motions of the robot 10.

<Robot 10>

The robot 10 is, for example, an industrial robot or the like that is well known to one skilled in the art, and drives movable members (not shown) of the robot 10 by driving a servomotor not shown that is arranged for each of a plurality of joint axes not shown, which are included in the robot 10, based on a drive instruction from the robot control device (not shown).

Though the robot 10 will be described below as a 6-axis vertically articulated robot having six joint axes J1 to J6, the robot 10 may be a vertically articulated robot other than the six-axis one and may be a horizontally articulated robot, a parallel link robot, or the like.

<Camera 40>

The camera 40 as an external camera is, for example, a digital camera or the like and is installed being fixed to a wall or a pillar in a factory or the like in which the robot 10 is arranged so that the robot 10 and a worker U, who is a user carrying the safety vision device 20 described later, can be photographed. The camera 40 may be a camera mounted on a smartphone, a tablet terminal, AR (augmented reality) glasses, MR (mixed reality) glasses or the like.

The camera 40 photographs the robot 10 and the worker U at a predetermined frame rate (for example, 30 frames/s) to generate a frame image which is a two-dimensional image projected on a plane vertical to the optical axis of the camera 40. The camera 40 outputs the generated frame image to the safety vision device 20. The frame image generated by the camera 40 may be a visible light image such as an RGB color image or a gray-scale image.

It is assumed that the robot coordinate system of the robot 10 and the camera coordinate system of the camera 40 are associated in the world coordinate system by calibration performed in advance.

<Safety Vision Device 20>

The safety vision device 20 is, for example, a smartphone, a tablet terminal, AR (augmented reality) glasses, or MR (mixed reality) glasses.

As shown in FIG. 1, the safety vision device 20 includes a control unit 21, a communication unit 22, and a storage unit 23. The control unit 21 includes a three-dimensional object recognition unit 211, a self-position estimation unit 212, an input unit 213, an estimation unit 214, an approach determination unit 215, and a notification unit 216.

The communication unit 22 is a communication control device to perform data transmission/reception with a network such as a wireless LAN (local area network), Wi-Fi (registered trademark), and a mobile phone network conforming to a standard such as 4G or 5G. For example, the communication unit 22 may directly communicate with the camera 40 or may communicate with the robot 10 via the robot control device (not shown) that controls motions of the robot 10.

The storage unit 23 is, for example, a ROM (read-only memory) or an HDD (hard disk drive) and stores a system program, a safety vision application program, and the like executed by the control unit 21 described later. Further, the storage unit 23 may store a human three-dimensional skeleton estimation model 231 described later, a robot three-dimensional skeleton estimation model 232 configured with a two-dimensional skeleton estimation model 2321 and a joint angle estimation model 2322 described later, and three-dimensional recognition model data 233.

<Human Three-Dimensional Skeleton Estimation Model 231>

The human three-dimensional skeleton estimation model 231 is a trained model that is generated by a machine learning device not shown executing supervised learning, using training data configured with input data of frame images of video of an arbitrary person acquired from a dataset such as Human 3.6M (http://vision.imar.ro/human3.6m/description.php) and label data of three-dimensional joint point data indicating three-dimensional coordinate values of positions of joint points of the arbitrary person annotated in the frame images in advance, based on a deep learning model, for example, used for a well-known 3D pose estimation method (for example, https://engineer.dena.com/posts/2019.12/cv-papers-19-3d-human-pose-estimation/).

<Robot Three-Dimensional Skeleton Estimation Model 232>

Figure 2:
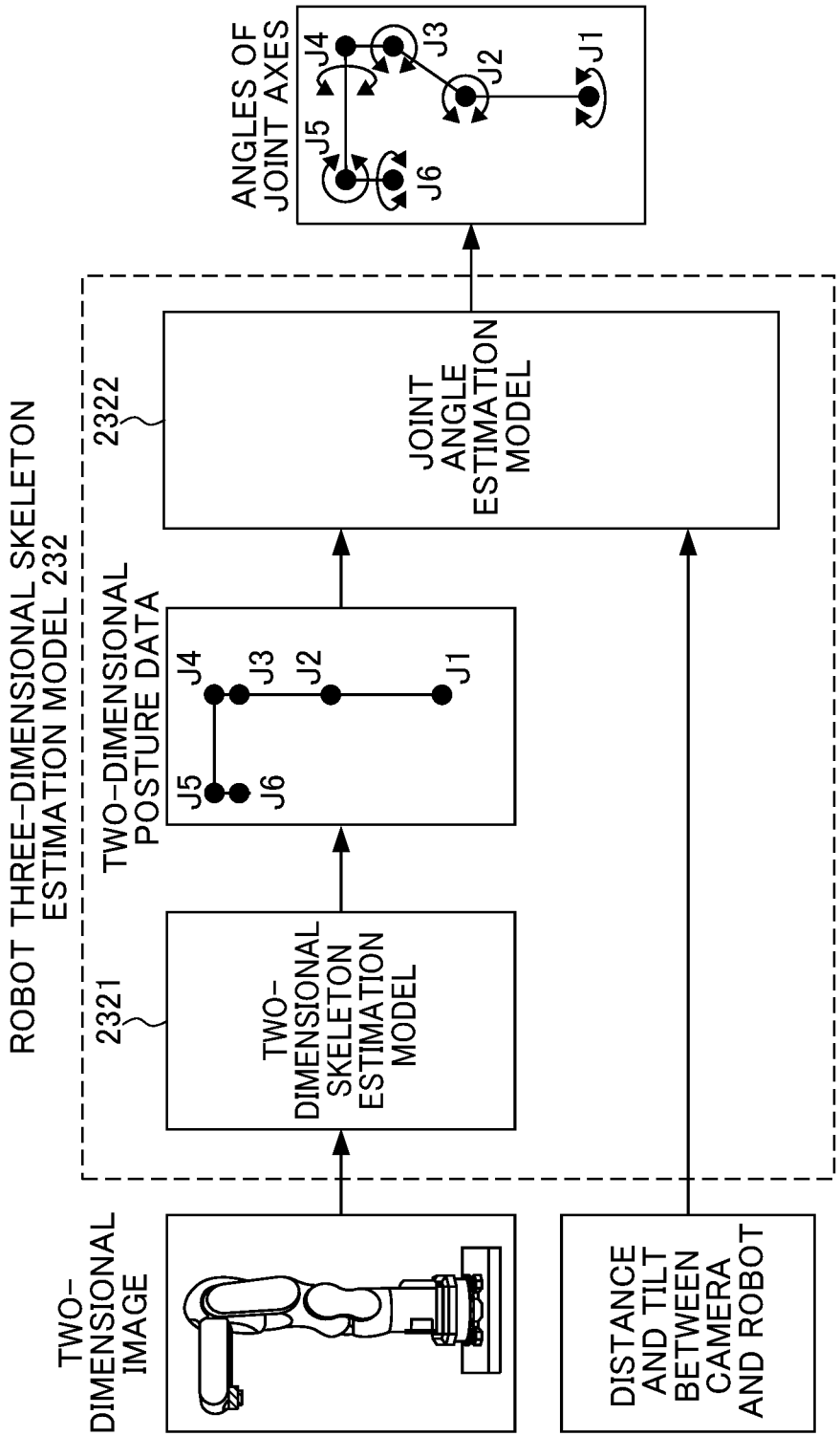
FIG. 2 is a diagram showing an example of a relationship between a two-dimensional skeleton estimation model and a joint angle estimation model as a robot three-dimensional skeleton estimation model.

As shown in FIG. 2 the robot three-dimensional skeleton estimation model 232 is configured with the two-dimensional skeleton estimation model 2321 and the joint angle estimation model 2322.

FIG. 2 is a diagram showing an example of a relationship between the two-dimensional skeleton estimation model 2321 and the joint angle estimation model 2322 as the robot three-dimensional skeleton estimation model 232.

As shown in FIG. 2, the two-dimensional skeleton estimation model 2321 is a CNN (convolutional neural network) that receives input of a frame image of the robot 10 captured by the camera 40 and outputs a two-dimensional posture of pixel coordinates indicating positions of the centers of the joint axes J1 to J6 of the robot 10 in the frame image.

The two-dimensional skeleton estimation model 2321 is generated by the machine learning device not shown executing supervised learning, using training data configured with input data of frame images of the robot 10 in various postures captured by the camera 40 and label data of values of two-dimensional coordinates (pixel coordinates) indicating positions of the centers of the joint axes J1 to J6 in each frame image at the time when the frame image was captured, for example, based on a deep learning model used for a well-known markerless animal tracking tool (for example, DeepLabCut) or the like.

The joint angle estimation model 2322 is a neural network or the like that receives input of the distance and tilt between the camera 40 and the robot 10, and the two-dimensional posture of the pixel coordinates indicating the positions of the centers of the joint axes J1 to J6 of the robot 10 outputted from the two-dimensional skeleton estimation model 2321 and normalized with the width and height of the frame image, with the joint axis J1, which is a base link of the robot 10, as the origin, and outputs angles of the joint axes J1 to J6 of the robot 10.

The joint angle estimation model 2322 is generated by the machine learning device not shown executing supervised learning, for example, using training data configured with input data including distances and tilts between the camera 40 and the robot 10, and two-dimensional postures indicating normalized positions of the centers of the joint axes J1 to J6, and label data of angles of the joint axes J1 to J6 of the robot 10 at the time when frame images were captured.

Details of the machine learning device for generating the robot three-dimensional skeleton estimation model 232 (the two-dimensional skeleton estimation model 2321 and the joint angle estimation model 2322) will be described later.

<Three-Dimensional Recognition Model Data 233>

In the three-dimensional recognition model data 233, for example, feature values such as an edge quantity extracted from each of a plurality of frame images of the robot 10 are stored as a three-dimensional recognition model, the plurality of frame images having been captured by the camera 40 in advance by changing the posture and direction of the robot 10. Further, in the three-dimensional recognition model data 233, three-dimensional coordinate values of the origin of the robot coordinate system of the robot 10 in the world coordinate system (hereinafter also referred to as "the robot origin") at the time when the frame image of each of the three-dimensional recognition models was captured, and information indicating a direction of each of the X, Y, and Z axes of the robot coordinate system in the world coordinate system may be stored in association with the three-dimensional recognition model.

<Control Unit 21>

The control unit 21 includes a CPU (central processing unit), a ROM, a RAM, a CMOS (complementary metal-oxide-semiconductor) memory and the like, and these are configured being mutually communicable via a bus and are well-known to one skilled in the art.

The CPU is a processor that performs overall control of the safety vision device 20. The CPU reads out the system program and the safety vision application program stored in the ROM via the bus, and controls the whole safety vision device 20 according to the system program and the safety vision application program. Thereby, as shown in FIG. 1, the control unit 21 is configured to realize the functions of the three-dimensional object recognition unit 211, the self-position estimation unit 212, the input unit 213, the estimation unit 214, the approach determination unit 215, and the notification unit 216. In the RAM, various kinds of data such as temporary calculation data and display data are stored. The CMOS memory is backed up by a battery not shown and is configured as a nonvolatile memory in which a storage state is kept even when the safety vision device 20 is powered off.

<Three-Dimensional Object Recognition Unit 211>

The three-dimensional object recognition unit 211 acquires a frame image of the robot 10 captured by the camera 40, for example, via the communication unit 22. The three-dimensional object recognition unit 211 extracts feature values such as an edge quantity from the frame image of the robot 10 captured by the camera 40, for example, using a well-known robot three-dimensional coordinate recognition method. Here, as for the well-known method, see, for example, "https://linx.jp/product/mvtec/halcon/feature/3d_vision.html".

The three-dimensional object recognition unit 211 performs matching between the extracted feature values and the feature values of the three-dimensional recognition models stored in the three-dimensional recognition model data 233. Based on a result of the matching, the three-dimensional object recognition unit 211 acquires, for example, three-dimensional coordinate values of the robot origin in the world coordinate system and information indicating the direction of each of the X, Y, and Z axes of the robot coordinate system in a three-dimensional recognition model with the highest matching degree.

<Self-Position Estimation Unit 212>

The self-position estimation unit 212 acquires three-dimensional coordinate values of the origin of the camera coordinate system of the camera 40 in the world coordinate system (hereinafter also referred to as "the three-dimensional coordinate values of the camera 40", for example, using a well-known self-position estimation method. Based on the acquired three-dimensional coordinate values of the camera 40 and the acquired three-dimensional coordinate values of the robot origin, an information acquisition unit 301 calculates the distance and tilt between the camera 40 and the robot 10.

Since the robot 10 and the camera 40 are fixedly arranged in a factory, the self-position estimation unit 212 may calculate, when the safety vision application program is started, the three-dimensional coordinate values of the robot origin and the three-dimensional coordinate values of the camera 40 in the world coordinate system, and the distance and tilt between the camera 40 and the robot 10 only once and store them into the storage unit 23.

<Input Unit 213>

The input unit 213 inputs a frame image of the worker U and the robot 10 captured by the camera 40, and the distance and tilt between the camera 40 and the robot 10 calculated by the self-position estimation unit 212.

<Estimation Unit 214>

The estimation unit 214 inputs the frame image of the worker U and the robot 10, and the distance and tilt between the camera 40 and the robot 10, which have been inputted by the input unit 213, to the human three-dimensional skeleton estimation model 231 and the robot three-dimensional skeleton estimation model 232.

Specifically, the estimation unit 214 estimates three-dimensional joint point data indicating three-dimensional coordinate values of positions of joint points of the worker U in the inputted frame image, from the output of the human three-dimensional skeleton estimation model 231.

Figure 3:
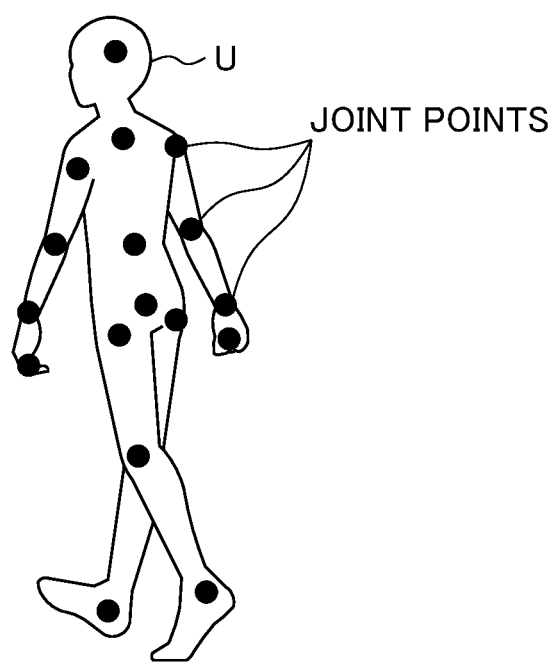
FIG. 3 is a diagram showing an example of positions of joint points of a worker estimated by an estimation unit.

FIG. 3 is a diagram showing an example of the positions of the joint points of the worker U estimated by the estimation unit 214.

As shown in FIG. 3, the joint points of the worker U estimated by the estimation unit 214 are indicated, for example, by black points.

Further, the estimation unit 214 estimates angles of the joint axes J1 to J6 of the robot 10 in the inputted frame image, from the output of the robot three-dimensional skeleton estimation model 232.

As described above, the estimation unit 214 normalizes pixel coordinates of positions of the centers of the joint axes J1 to J6 outputted from the two-dimensional skeleton estimation model 2321 and inputs the pixel coordinates to the joint angle estimation model 2322. Further, the estimation unit 214 may be adapted to set each confidence degree $c_i$ of a two-dimensional posture outputted from the two-dimensional skeleton estimation model 2321 to "1" when the confidence degree $c_i$ is 0.5 or above and to "0" when the confidence degree $c_i$ is below 0.5.

If a part of the worker U is hidden by the robot 10 in the frame image inputted by the input unit 213, the estimation unit 214 may estimate three-dimensional joint point data of the worker U in the frame image in which the part of the worker U is hidden by the robot 10, using time-series data of three-dimensional joint point data of the worker U estimated from a plurality of chronologically consecutive frame images before the frame image, in which the whole worker U and the whole robot 10 are photographed.

Or alternatively, if a part of the robot 10 is hidden by the worker U in the frame image inputted by the input unit 213, the estimation unit 214 may estimate angles of the joint axes J1 to J6 of the robot 10 in the frame image in which the part of the robot 10 is hidden by the worker U, using time-series data of angles of the joint axes J1 to J6 of the robot 10 estimated from a plurality of chronologically consecutive frame images before the frame image, in which the whole worker U and the whole robot 10 are photographed.

<Approach Determination Unit 215>

The approach determination unit 215 calculates an area indicating a range of the worker U and an area indicating a range of the robot 10, based on the three-dimensional joint point data of the worker U and the angles of the joint axes J1 to J6 of the robot 10 estimated by the estimation unit 214, and outputs an instruction to decelerate or stop the robot 10, to the robot control device (not shown) according to a degree of overlap between the calculated areas of the worker U and the robot 10.

Specifically, by arranging the joint points of the worker U in the three-dimensional space of the world coordinate system, for example, based on the three-dimensional joint point data of the worker U estimated by the estimation unit 214, and connecting the joint points with straight lines, the approach determination unit 215 generates a skeleton of the worker U. By adding a shape such as a rectangular parallelepiped with a length, a depth, and a height that are set in advance, to each straight line of the generated skeleton, the approach determination unit 215 calculates the area indicating the range of the worker U.

Further, the approach determination unit 215 solves forward kinematics from the angles of the joint axes J1 to J6 estimated by the estimation unit 214, using a DH (Denavit-Hartenberg) parameter table defined in advance, to calculate three-dimensional coordinate values of the positions of the centers of the joint axes J1 to J6. Then, by arranging the calculated positions of the centers of the joint axes J1 to J6 of the robot 10 in the three-dimensional space of the world coordinate system, the approach determination unit 215 generates a skeleton of the robot 10. By adding a shape such as a rectangular parallelepiped with a length, a depth, and a height that are set in advance, to each link of the generated skeleton of the robot 10, the approach determination unit 215 calculates the area indicating the range of the robot 10.

The DH parameter table is created in advance, for example, based on the specifications of the robot 10 and stored into the storage unit 23.

Figure 4:
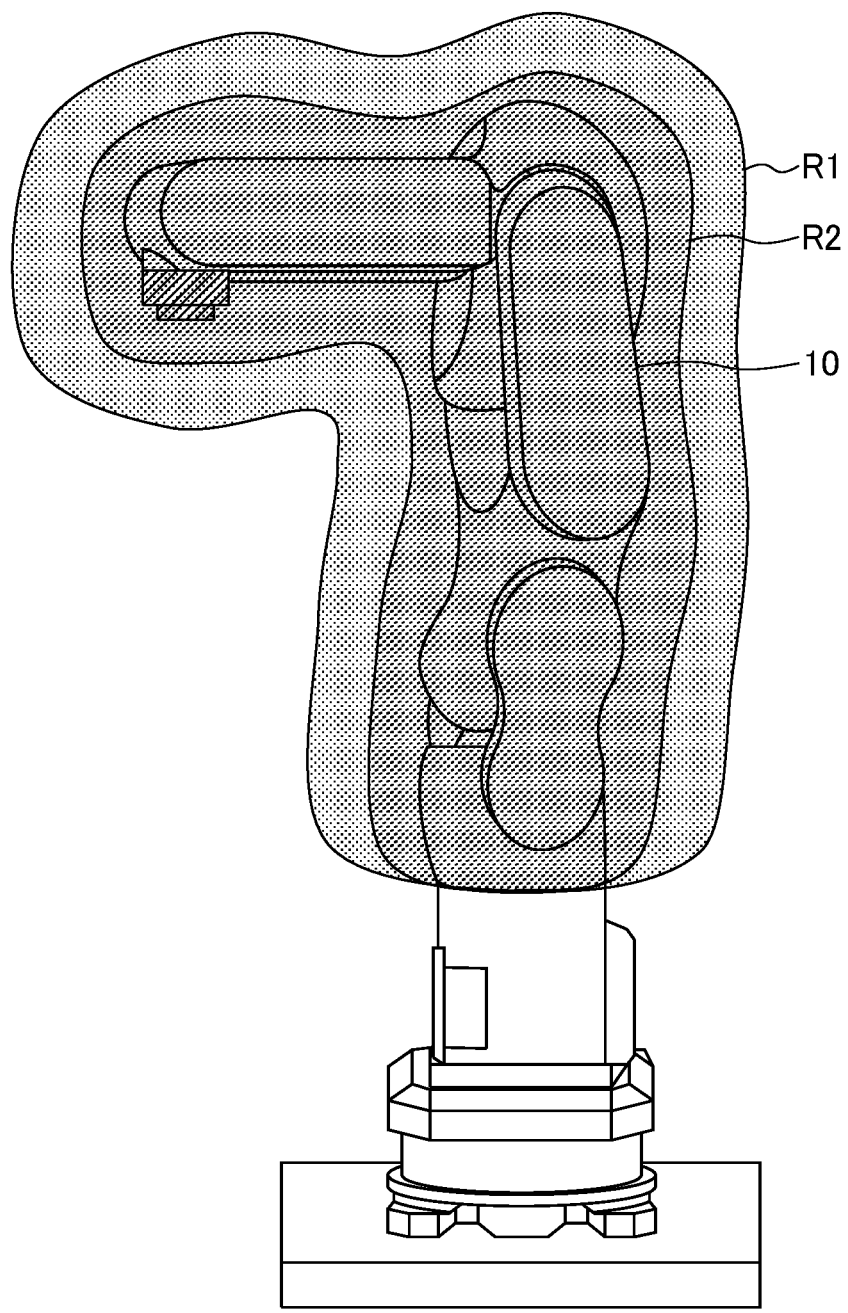
FIG. 4 is a diagram showing an example of an area of a robot.

FIG. 4 is a diagram showing an example of the area of the robot 10. The area of the robot 10 shown in FIG. 4 is configured with two areas R1 and R2 with different sizes. That is, the length, depth, and height of the area R1 are set larger than the length, depth, and height of the area R2.

The approach determination unit 215 determines whether the calculated area of the worker U in the world coordinate system overlaps with the area R1 or the area R2 of the robot 10. If the area of the worker U overlaps only with the area R1 of the robot 10, the approach determination unit 215 determines that there is time before the worker U and the robot 10 collide, and causes the motion of the robot 10 to decelerate by outputting a deceleration instruction to the robot control device (not shown).

If the area of the worker U also overlaps with the area R2 of the robot 10, the approach determination unit 215 determines that there is a danger that the worker U and the robot 10 immediately collide, and causes the motion of the robot 10 to stop by outputting a stop instruction to the robot control device (not shown).

By providing the two areas R1 and R2 with different sizes as the area of the robot 10 as described above, the approach determination unit 215 can appropriately determine which of the deceleration instruction or the stop instruction is to be outputted.

<Notification Unit 216>

If the approach determination unit 215 outputs the deceleration or stop instruction, the notification unit 216 outputs a warning sound via a speaker (not shown) included in the safety vision device 20.

The notification unit 216 may display a message indicating a warning to a display device (not shown) such as an LCD (liquid crystal display) included in the safety vision device 20.

<Determination Process of Safety Vision Device 20>

Next, an operation related to a determination process of the safety vision device 20 according to the present embodiment will be described.

Figure 5:
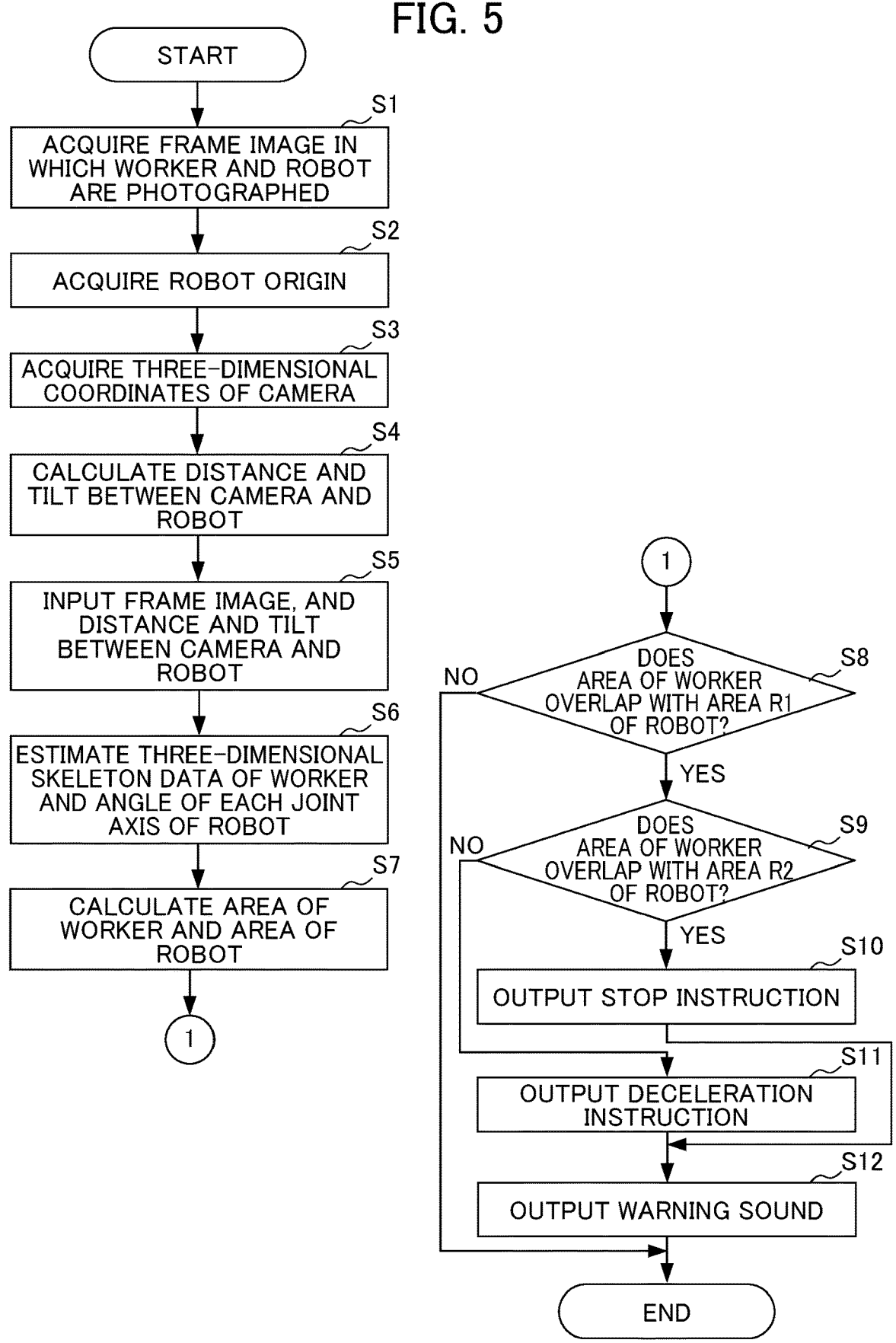
FIG. 5 is a flowchart illustrating a determination process of a safety vision device.

FIG. 5 is a flowchart illustrating the determination process of the safety vision device 20. The flow shown here is repeatedly executed while the safety vision device 20 is executing the safety vision application program.

At Step S1, the three-dimensional object recognition unit 211 acquires a frame image of the worker U and the robot 10 captured by the camera 40 at a predetermined frame rate.

At Step S2, the three-dimensional object recognition unit 211 acquires three-dimensional coordinate values of the robot origin in the world coordinate system, and information indicating a direction of each of the X, Y, and Z axes of the robot coordinate system, based on the frame image acquired at Step S1 and the three-dimensional recognition model data 233.

At Step S3, the self-position estimation unit 212 acquires three-dimensional coordinate values of the camera 40 in the world coordinate system, based on the frame image acquired at Step S1.

At Step S4, the self-position estimation unit 212 calculates the distance and tilt between the camera 40 and the robot 10, based on the three-dimensional coordinate values of the camera 40 acquired at Step S3 and the three-dimensional coordinate values of the robot origin of the robot 10 acquired at Step S2.

At Step S5, the input unit 213 inputs the frame image acquired at Step S1 and the distance and tilt between the camera 40 and the robot 10 calculated at Step S4.

At Step S6, by inputting the frame image inputted at Step S5 to the human three-dimensional skeleton estimation model 231, the estimation unit 214 estimates three-dimensional joint point data indicating three-dimensional coordinate values of positions of the joint points of the worker U in the inputted frame image. Further, by inputting the frame image, and the distance and tilt between the camera 40 and the robot 10, which have been inputted at Step S2, to the robot three-dimensional skeleton estimation model 232, the estimation unit 214 estimates angles of the joint axes J1 to J6 of the robot 10 at the time when the inputted frame image was captured.

At Step S7, the approach determination unit 215 calculates an area indicating the range of the worker U, based on the three-dimensional joint point data of the worker U estimated at Step S6. Further, the approach determination unit 215 calculates areas R1 and R2 of the robot 10, based on the angles of the joint axes J1 to J6 of the robot 10 estimated at Step S6.

At Step S8, the approach determination unit 215 determines whether the area of the worker U calculated at Step S7 overlaps with the area R1 of the robot 10 calculated at Step S7 or not. If the area of the worker U overlaps with the area R1 of the robot 10, the process proceeds to Step S9. On the other hand, if the area of the worker U does not overlap with the area R1 of the robot 10, the safety vision device 20 ends the determination process.

At Step S9, the approach determination unit 215 determines whether the area of the worker U calculated at Step S7 overlaps with the area R2 of the robot 10 calculated at Step S7 or not. If the area of the worker U overlaps with the area R2 of the robot 10, the process proceeds to Step S10. On the other hand, if the area of the worker U does not overlap with the area R2 of the robot 10, the process proceeds to Step S11.

At Step S10, the approach determination unit 215 outputs a stop instruction to the robot control device (not shown).

At Step S11, the approach determination unit 215 outputs a deceleration instruction to the robot control device (not shown).

At Step S12, the notification unit 216 outputs a warning sound via the speaker (not shown) of the safety vision device 20.

According to the above, by inputting a frame image in which the worker U and the robot 10 are photographed, and the distance and tilt between the camera 40 and the robot 10 to the human three-dimensional skeleton estimation model 231 and the robot three-dimensional skeleton estimation model 232 as a trained model, the safety vision device 20 according to the one embodiment estimates three-dimensional joint point data indicating three-dimensional coordinate values of positions of the joint points of the worker U and angles of the joint axes J1 to J6 of the robot 10. The safety vision device 20 calculates an area indicating the range of the worker U based on the estimated three-dimensional joint point data, and calculates areas R1 and R2 indicating the range of the robot 10 based on the angles of the joint axes J1 to J6. The safety vision device 20 determines whether or not the area of the worker U overlaps with the area R1 or R2 of the robot 10, and outputs a deceleration or stop instruction to the robot control device (not shown).

Thereby, it is possible for the safety vision device 20 to, when the worker U enters the motion area of the robot 10, cause the robot 10 to decelerate or stop without using an area sensor.

The safety vision device 20 has been described above. The machine learning device for generating the robot three-dimensional skeleton estimation model 232 will be described.

Figure 7:
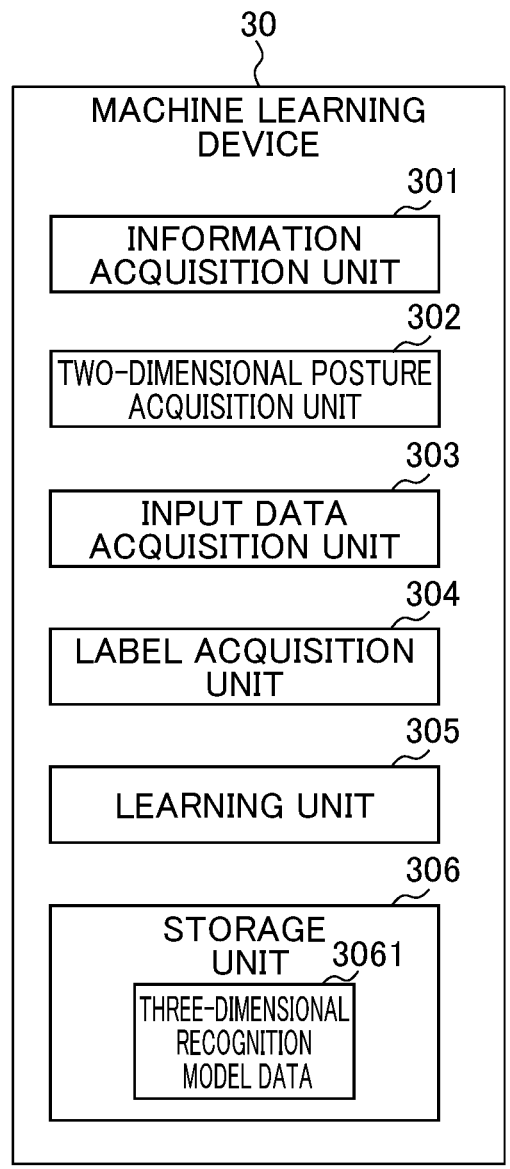
FIG. 7 is a functional block diagram showing a functional configuration example of a machine learning device.

FIG. 7 is a functional block diagram showing a functional configuration example of a machine learning device 30.

As shown in FIG. 7, the machine learning device 30 includes an information acquisition unit 301, a two-dimensional posture acquisition unit 302, an input data acquisition unit 303, a label acquisition unit 304, a learning unit 305, and a storage unit 306.

In the description below, the machine learning device 30 acquires, as training data, only such pieces of data that are acquired at a timing when all the pieces of data can be synchronized. For example, if the camera 40 captures frame images at 30 frames/s, the period with which angles of the plurality of joint axes included in the robot 10 can be acquired is 100 milliseconds, and other data can be immediately acquired, then the machine learning device 30 acquires training data with a predetermined period that enables synchronization, such as 100 milliseconds.

<Storage Unit 306>

The storage unit 306 is a RAM (random access memory) or the like, and stores input data acquired by the input data acquisition unit 303 described later, label data acquired by the label acquisition unit 304 described later, leaned models constructed by the learning unit 305 described later, and the like. Further, the storage unit 306 may store three-dimensional recognition model data 3061.

The three-dimensional recognition model data 3061 is similar, for example, to the three-dimensional recognition model data 233 of the safety vision device 20, and description thereof will be omitted.

<Information Acquisition Unit 301>

The information acquisition unit 301 acquires a frame image of the robot 10 captured by the camera 40, for example, via a communication unit not shown. The information acquisition unit 301 acquires three-dimensional coordinate values of the robot origin in the world coordinate system and information indicating a direction of each of the X, Y, and Z axes of the robot coordinate system from the acquired frame image, for example, similarly to the three-dimensional object recognition unit 211 of the safety vision device 20.

Further, the information acquisition unit 301 may be adapted to acquire three-dimensional coordinate values of the camera 40 in the world coordinate system, and calculate the distance and tilt between the camera 40 and the robot 10 based on the acquired three-dimensional coordinate values of the camera 40 and the acquired three-dimensional coordinate values of the robot origin, similarly to the self-position estimation unit 212 of the safety vision device 20.

<Two-Dimensional Posture Acquisition Unit 302>

The two-dimensional posture acquisition unit 302 transmits a request to the robot 10 with the above-described predetermined period that enables synchronization, such as 100 milliseconds, for example, via the communication unit not shown to acquire angles of the joint axes J1 to J6 of the robot 10 at the time when the frame image acquired by the information acquisition unit 301 was captured.

Then, the two-dimensional posture acquisition unit 302 solves forward kinematics from the acquired angles of the joint axes J1 to J6, for example, using a DH parameter table defined in advance, to calculate three-dimensional coordinate values of positions of the centers of the joint axes J1 to J6 and calculate a three-dimensional posture of the robot 10 in the world coordinate system. The DH parameter table is created in advance, for example, based on the specifications of the robot 10 and is stored into the storage unit 306.

Further, the two-dimensional posture acquisition unit 302 arranges the positions of the centers of the joint axes J1 to J6 of the robot 10 calculated by the forward kinematics in the three-dimensional space of the world coordinate system, for example, using a well-known method for projection to a two-dimensional plane, and generates two-dimensional coordinates (pixel coordinates) $(x_i, y_i)$ of the positions of the centers of the joint axes J1 to J6 as a two-dimensional posture of the robot 10, by projecting, from the point of view of the camera 40 decided by the distance and tilt between the camera 40 and the robot 10 calculated by the information acquisition unit 301, onto a projection plane decided by the distance and tilt between the camera 40 and the robot 10. Here, i is an integer from 1 to 6.

Figure 8A:
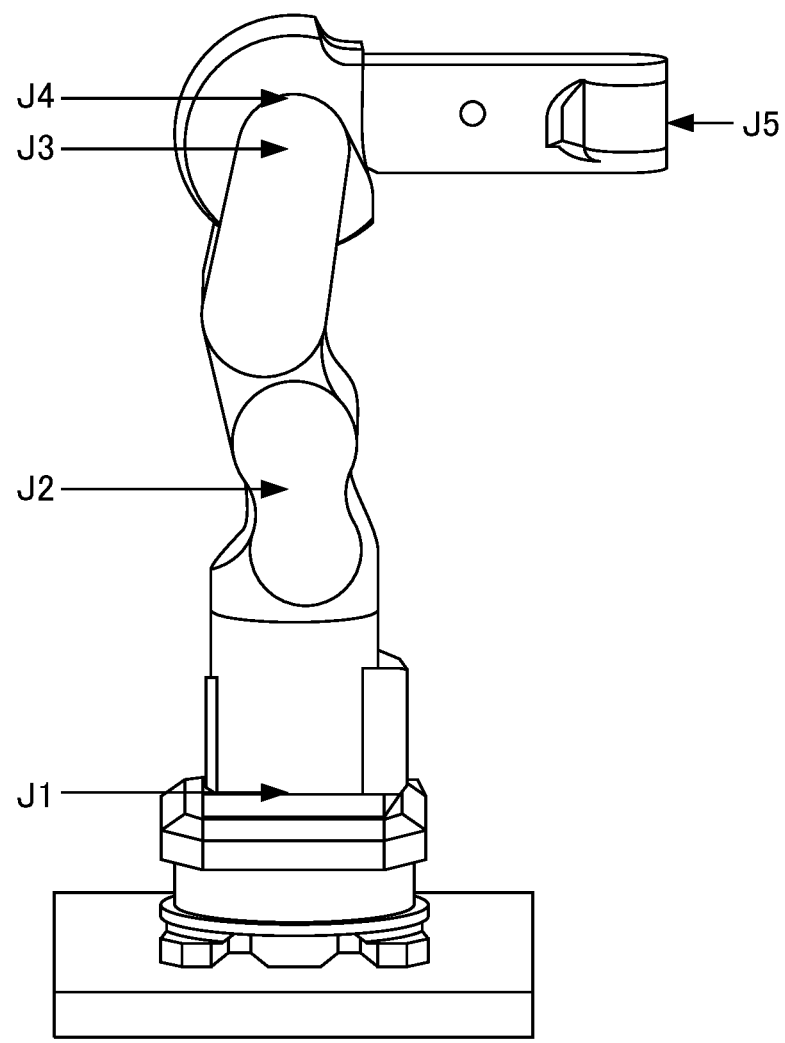
FIG. 8A is a diagram showing an example of a frame image in which the angle of a joint axis J4 is 90 degrees.
Figure 8B:
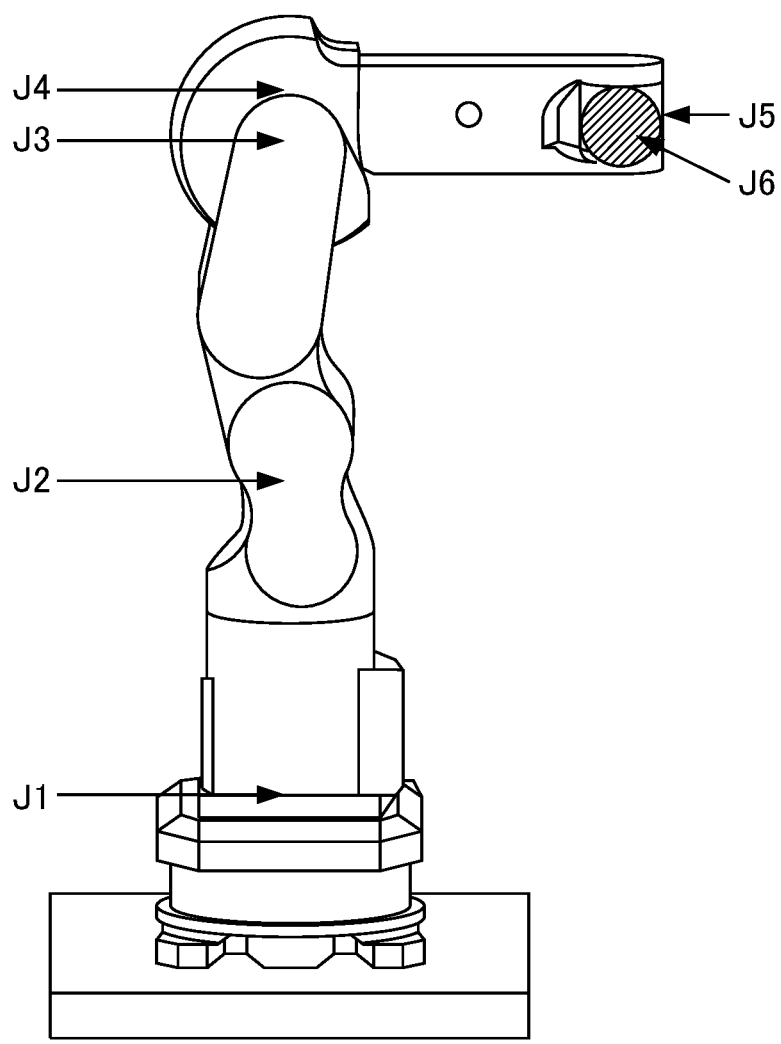
FIG. 8B is a diagram showing an example of a frame image in which the angle of the joint axis J4 is −90 degrees.

As shown in FIGS. 8A and 8B, there may be a case where a joint axis is hidden in a frame image, depending on a posture of the robot 10 and a photographing direction.

FIG. 8A is a diagram showing an example of a frame image in which the angle of the joint axis J4 is 90 degrees. FIG. 8B is a diagram showing an example of a frame image in which the angle of the joint axis J4 is −90 degrees.

In the frame image of FIG. 8A, the joint axis J6 is hidden and not seen. In the frame image of FIG. 8B, the joint axis J6 is seen.

Therefore, the two-dimensional posture acquisition unit 302 connects adjacent joint axes of the robot 10 with a line segment, and defines a thickness for each line segment with a link width of the robot 10 set in advance. The two-dimensional posture acquisition unit 302 determines whether there is another joint axis on each line segment or not, based on a three-dimensional posture of the robot 10 calculated by forward kinematics and an optical axis direction of the camera 40 decided by the distance and tilt between the camera 40 and the robot 10. In a case like FIG. 8A where that another joint axis Ji exists on a side opposite to the camera 40 side in the depth direction, relative to a line segment, the two-dimensional posture acquisition unit 302 sets the confidence degree $c_i$ of that other joint axis Ji (the joint axis J6 in FIG. 8A) to "0". In a case like FIG. 8B where that other joint axis Ji exists on the camera 40 side relative to the line segment, the two-dimensional posture acquisition unit 302 sets the confidence degree $c_i$ of that other joint axis Ji (the joint axis J6 in FIG. 8B) to "1".

That is, the two-dimensional posture acquisition unit 302 may include, for the two-dimensional coordinates (pixel coordinates) $(x_i, y_i)$ of the projected positions of the centers of the joint axes J1 to J6, the confidence degrees $c_i$ indicating whether the joint axes J1 to J6 are shown or not, respectively, in a frame image, into the two-dimensional posture of the robot 10.

As for training data for performing supervised learning in the machine learning device 30, it is desirable that many pieces of training data are prepared.

Figure 9:
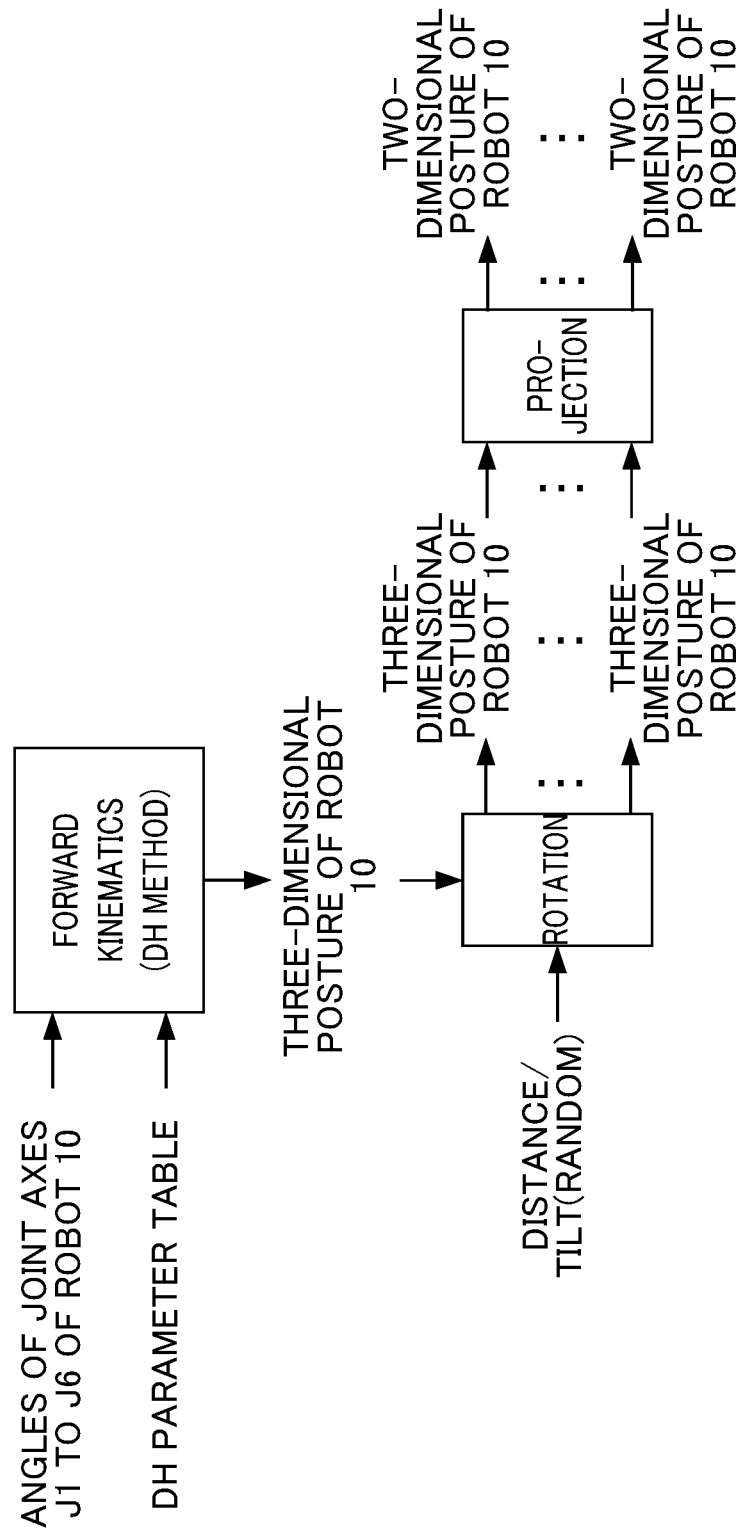
FIG. 9 is a diagram showing an example for increasing the number of pieces of training data.

FIG. 9 is a diagram showing an example for increasing the number of pieces of training data.

As shown in FIG. 9, for example, in order to increase the number of pieces of training data, the two-dimensional posture acquisition unit 302 randomly gives a distance and a tilt between the camera 40 and the robot 10 to cause a three-dimensional posture of the robot 10 calculated by forward kinematics to rotate. The two-dimensional posture acquisition unit 302 may generate many two-dimensional postures of the robot 10, by projecting the rotated three-dimensional posture of the robot 10 to a two-dimensional plane decided by the randomly given distance and tilt.

<Input Data Acquisition Unit 303>

The input data acquisition unit 303 acquires frame images of video of an arbitrary person from a dataset such as Human 3.6M, as input data, for example, via the communication unit not shown in order to generate the human three-dimensional skeleton estimation model 231 described above. Further, the input data acquisition unit 303 acquires frame images from the camera 40, and distances and tilts between the camera 40 and the robot 10 at the time when the frame images were captured, which have been acquired from the information acquisition unit 301, as input data in order to generate the robot three-dimensional skeleton estimation model 232. The input data acquisition unit 303 stores the acquired input data into the storage unit 306.

Figure 10:
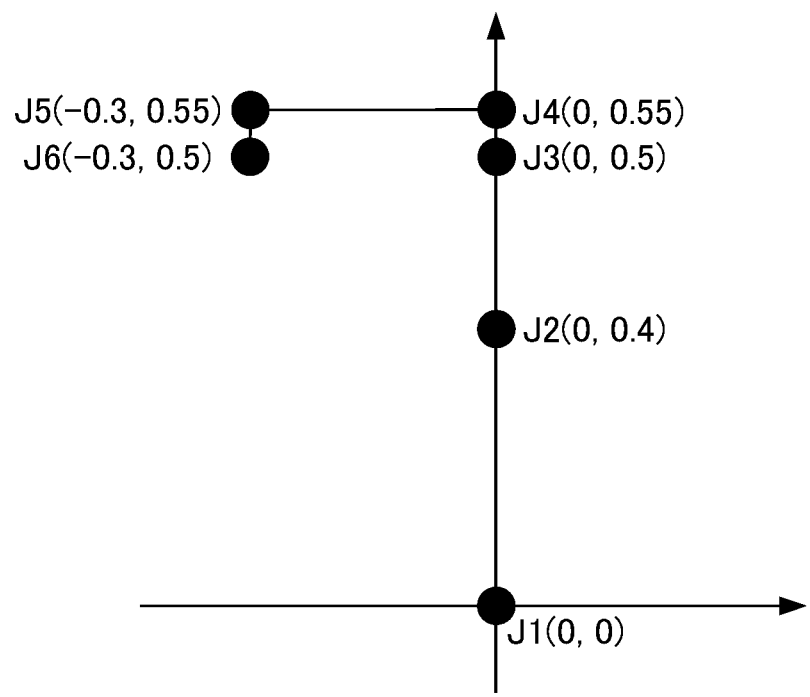
FIG. 10 is a diagram showing an example of coordinate values of joint axes on normalized XY coordinates.

At the time of generating the joint angle estimation model 2322 configuring the robot three-dimensional skeleton estimation model 232, the input data acquisition unit 303 may convert the two-dimensional coordinates (pixel coordinates) $(x_i, y_i)$ of the positions of the centers of the joint axes J1 to J6 included in the two-dimensional posture generated by the two-dimensional posture acquisition unit 302 to values of XY coordinates that have been normalized to satisfy $-1<X<1$ by being divided by the width of the frame image and satisfy $-1<Y<1$ by being divided by the height of the frame image, with the joint axis J1, which is a base link of the robot 10, as the origin, as shown in FIG. 10.

<Label Acquisition Unit 304>

The label acquisition unit 304 acquires three-dimensional joint point data indicating three-dimensional coordinate values of positions of joint points in the camera coordinate system that have been annotated in advance in each of the frame images of the arbitrary person described above as label data (correct answer data), from the above-described dataset such as Human 3.6M, for example, via the communication unit not shown in order to generate the human three-dimensional skeleton estimation model 231 described above. The label acquisition unit 304 may convert the camera coordinate system of the three-dimensional joint point data to the world coordinate system.

Further, the label acquisition unit 304 acquires angles of the joint axes J1 to J6 of the robot 10 at the time when frame images were captured with the above-stated predetermined period that enables synchronization, such as 100 milliseconds, and two-dimensional postures indicating positions of the centers of the joint axes J1 to J6 of the robot 10 in the frame images, from the two-dimensional posture acquisition unit 302 as label data (correct answer data) in order to generate the robot three-dimensional skeleton estimation model 232 described above. The label acquisition unit 304 stores the acquired label data into the storage unit 306.

<Learning Unit 305>

The learning unit 305 accepts pairs configured with the input data and labels described above, as training data. By performing supervised learning using the accepted training data, the learning unit 305 constructs the human three-dimensional skeleton estimation model 231 and the robot three-dimensional skeleton estimation model 232, which is configured with the two-dimensional skeleton estimation model 2321 and the joint angle estimation model 2322.

Then, the learning unit 305 provides the constructed human three-dimensional skeleton estimation model 231 and robot three-dimensional skeleton estimation model 232, which is configured with the two-dimensional skeleton estimation model 2321 and the joint angle estimation model 2322, for the safety vision device 20.

Description will be made below on construction of the two-dimensional skeleton estimation model 2321 and the joint angle estimation model 2322 configuring the robot three-dimensional skeleton estimation model 232.

<Two-Dimensional Skeleton Estimation Model 2321>

For example, as described above, based on a deep learning model used for a well-known markerless animal tracking tool (for example, DeepLabCut) or the like, the learning unit 305 performs supervised learning using training data configured with input data of frame images of the robot 10 captured by the camera 40 and labels of two-dimensional postures indicating positions of the centers of the joint axes J1 to J6 at the time when the frame images were captured, and generates the two-dimensional skeleton estimation model 2321 which receives input of a frame image of the worker U and the robot 10 captured by the camera 40, and outputs a two-dimensional posture of pixel coordinates indicating positions of the centers of the joint axes J1 to J6 of the robot 10 in the captured frame image.

Specifically, the two-dimensional skeleton estimation model 2321 is constructed based on a CNN (convolutional neural network) which is a neural network.

The convolutional neural network has a structure provided with a convolutional layer, a pooling layer, a fully connected layer, and an output layer.

In the convolutional layer, a predetermined parameter filter is applied to an inputted frame image in order to perform feature extraction such as edge extraction. The predetermined parameter of the filter corresponds to the weight of the neural network, and is learned by repeating forward propagation and back propagation.

In the pooling layer, the image outputted from the convolutional layer is blurred in order to allow position misalignment of the robot 10. Thereby, even if the position of the robot 10 fluctuates, the robot 10 can be regarded as the identical object.

By combining these convolutional layer and pooling layer, feature values can be extracted from the frame image.

In the fully connected layer, pieces of image data of feature parts that have been taken out through the convolutional layer and the pooling layer are combined to be one node, and a feature map of values converted by an activation function, that is, a feature map of confidence degrees is outputted.

Figure 11:
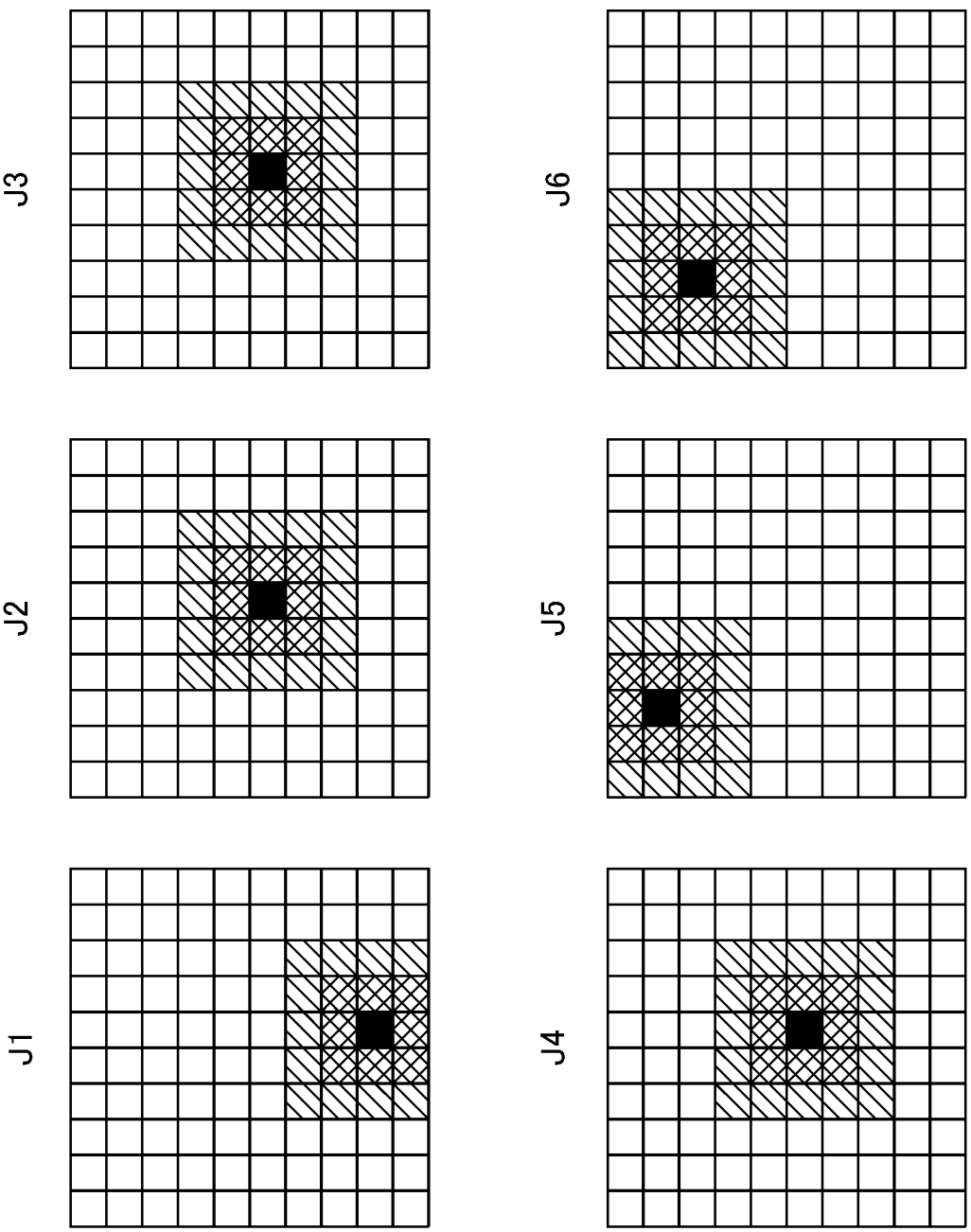
FIG. 11 is a diagram showing an example of feature maps of joint axes of the robot.

FIG. 11 is a diagram showing an example of feature maps of the joint axes J1 to J6 of the robot 10.

As shown in FIG. 11, in each of the feature maps of the joint axes J1 to J6, the value of the confidence degree $c_i$ is indicated within a range of 0 to 1. For a cell closer to the position of the center of a joint axis, a value closer to "1" is obtained. For a cell farther away from the position of the center of a joint axis, a value closer to "0" is obtained.

In the output layer, the row, column, and confidence degree (maximum) of a cell at which the confidence degree is the maximum value, in each of the feature maps of the joint axes J1 to J6, which are the output from the fully connected layer, is outputted. In a case where the frame image is convoluted to become 1/N in the convolutional layer, the row and column of each cell is increased by N times in the output layer, and pixel coordinates indicating the position of the center of each of the joint axes J1 to J6 in the frame image are set (N is an integer equal to or larger than 1).

FIG. 12 is a diagram showing an example of comparison between a frame image and an output result of the two-dimensional skeleton estimation model 2321.

<Joint Angle Estimation Model 2322>

The learning unit 305 performs supervised learning, for example, using training data configured with input data including distances and tilts between the camera 40 and the robot 10, and two-dimensional postures indicating the above-stated normalized positions of the centers of the joint axes J1 to J6, and label data of angles of the joint axes J1 to J6 of the robot 10 at the time when frame images were captured, to generate the joint angle estimation model 2322.

Though the learning unit 305 normalizes the two-dimensional posture of the joint axes J1 to J6 outputted from the two-dimensional skeleton estimation model 2321, the two-dimensional skeleton estimation model 2321 may be generated such that a normalized two-dimensional posture is outputted from the two-dimensional skeleton estimation model 2321.

FIG. 13 is a diagram showing an example of the joint angle estimation model 2322. Here, as the joint angle estimation model 2322, a multilayer neural network is exemplified in which two-dimensional posture data indicating positions of the joint axes J1 to J6 outputted from the two-dimensional skeleton estimation model 2321 and normalized, and the distance and tilt between the camera 40 and the robot 10 are the input layer, and angles of the joint axes J1 to J6 are the output layer, as shown in FIG. 13. The two-dimensional posture is indicated by $(x_i, y_i, c_i)$ including the coordinates $(x_i, y_i)$, which indicate normalized positions of the centers of the joint axes J1 to J6, and confidence degrees $c_i$, which is set to "1" if the confidence degree outputted from the two-dimensional skeleton estimation model 2321 is 0.5 or above, or set to "0" if the confidence degree is below 0.5.

Further, "inclination Rx of X axis", "inclination Ry of Y axis", and "inclination Rz of Z axis" are a rotation angle around the X axis, a rotation angle around the Y axis, and a rotation angle around the Z axis, between the camera 40 and the robot 10 in the world coordinate system that are calculated based on three-dimensional coordinate values of the camera 40 in the world coordinate system and three-dimensional coordinate values of the robot origin of the robot 10 in the world coordinate system.

The learning unit 305 may be adapted to, if acquiring new training data after constructing a trained model configured with the two-dimensional skeleton estimation model 2321 and the joint angle estimation model 2322, update the robot three-dimensional skeleton estimation model 232 configured with the two-dimensional skeleton estimation model 2321 and the joint angle estimation model 2322 which has been once constructed, by further performing supervised learning for the robot three-dimensional skeleton estimation model 232 configured with the two-dimensional skeleton estimation model 2321 and the joint angle estimation model 2322.

By doing so, training data can be automatically obtained from regular photographing of the robot 10, and, therefore, the accuracy of estimating angles of the joint axes J1 to J6 of the robot 10 can be increased on the daily basis.

The supervised learning described above may be performed as online learning, batch learning, or mini-batch learning.

The online learning is a learning method in which, each time a frame image of the robot 10 is captured, and training data is created, supervised learning is immediately performed.

The batch learning is a learning method in which, while capturing of a frame image of the robot 10 and creation of training data are repeated, a plurality of pieces of training data corresponding to the repetition are collected, and supervised learning is performed using all the collected pieces of training data. The mini-batch learning is an intermediate learning method between the online learning and the batch learning, in which supervised learning is performed each time some pieces of training data have been collected.

By the machine learning device described above, the robot three-dimensional skeleton estimation model 232 provided in the safety vision device 20 can be generated.

One embodiment has been described above. The safety vision device 20, however, is not limited to the above embodiment, and modifications, improvements and the like within a range that the object can be achieved are included.

Modification Example 1

In the above embodiment, the safety vision device 20 calculates one area for the worker U. However, the present invention is not limited thereto. For example, the safety vision device 20 may calculate two areas RU1 and RU2 with different sizes for the worker U similarly to the areas R1 and R2 of the robot 10. It is assumed that the length, depth, and height of the area RU1 are set larger than the length, depth, and height of the area RU2.

The safety vision device 20 may be adapted to, for example, when the area RU1 of the worker U overlaps with the area R1 of the robot 10, when the area RU2 of the worker U overlaps with the area R1 of the robot 10, or when the area RU1 of the worker U overlaps with the area R2 of the robot 10, output an instruction to decelerate the robot 10, to the robot control device (not shown).

The safety vision device 20 may be adapted to, when the smallest area RU2 of the worker U overlaps with the area R2 of the robot 10, output an instruction to stop the robot 10, to the robot control device (not shown).

Though the number of the areas of each of the worker U and the robot 10 is assumed to be one or two, three or more areas may be set.

By doing so, the safety vision device 20 can avoid collision between the worker U and the robot 10 more precisely.

Modification Example 2

Figure 6:
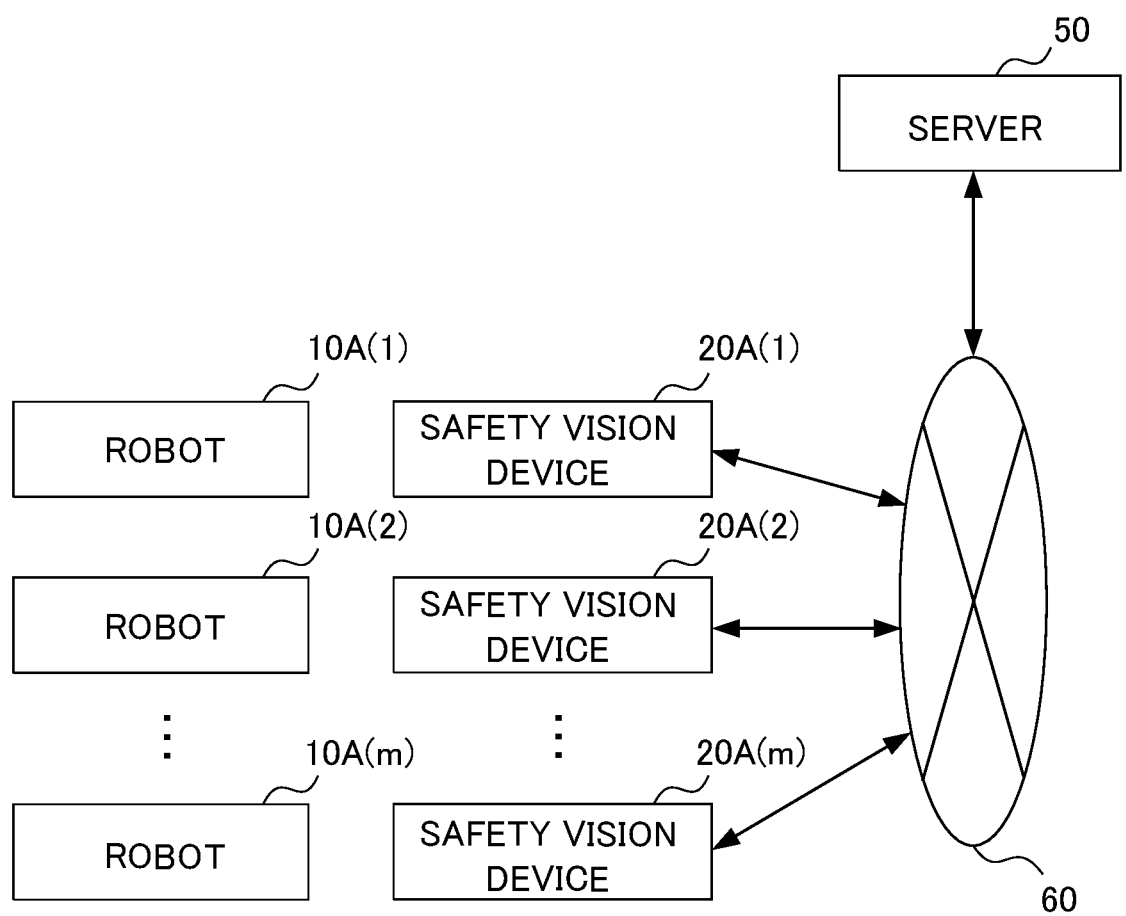
FIG. 6 is a diagram showing an example of a configuration of the safety vision system.

For example, in the above embodiment, the safety vision device 20 estimates three-dimensional joint point data of the worker U and angles of the joint axes J1 to J6 of the robot 10 from a frame image of the worker U and the robot 10, and the distance and tilt between the camera 40 and the robot 10, which have been inputted, using the human three-dimensional skeleton estimation model 231 and the robot three-dimensional skeleton estimation model 232. However, the present invention is not limited thereto. For example, as shown in FIG. 6, a server 50 may store the human three-dimensional skeleton estimation model 231 and the robot three-dimensional skeleton estimation model 232, and share the human three-dimensional skeleton estimation model 231 and the robot three-dimensional skeleton estimation model 232 with m safety vision devices 20A(1) to 20A(m) connected to the server 50 via a network 60 (m is an integer equal to or larger than 2). Thereby, even when a new robot and a new safety vision device are arranged, the human three-dimensional skeleton estimation model 231 and the robot three-dimensional skeleton estimation model 232 can be applied.

Each of robots 10A(1) to 10A(m) corresponds to the robot 10 of FIG. 1. Each of the safety vision devices 20A(1) to 20A(m) corresponds to the safety vision device 20 of FIG. 1.

Each function included in the safety vision device 20 in the one embodiment can be realized by hardware, software, or a combination thereof. Here, being realized by software means being realized by a computer reading and executing a program.

Each component included in the safety vision device 20 can be realized by hardware including an electronic circuit and the like, software, or a combination thereof. In the case of being realized by software, a program configuring the software is installed into a computer. The program may be recorded in a removable medium and distributed to a user or may be distributed by being downloaded to the user's computer via a network. In the case of being configured with hardware, a part or all of functions of each component included in the above devices can be configured with an integrated circuit (IC), for example, an ASIC (application specific integrated circuit), a gate array, an FPGA (field programmable gate array), a CPLD (complex programmable logic device), or the like.

The program can be supplied to the computer by being stored in any of various types of non-transitory computer-readable media. The non-transitory computer-readable media include various types of tangible storage media. Examples of the non-transitory computer-readable media include a magnetic recording medium (for example, a flexible disk, a magnetic tape, or a hard disk drive), a magneto-optical recording medium (for example, a magneto-optical disk), a CD-ROM (read-only memory), a CD-R, a CD-R/W, a semiconductor memory (for example, a mask ROM and a PROM (programmable ROM)), an EPROM (Erasable PROM), a flash ROM, and a RAM). The program may be supplied to the computer by any of various types of transitory computer-readable media. Examples of the transitory computer-readable media include an electrical signal, an optical signal and an electromagnetic wave. The transitory computer-readable media can supply the program to the computer via a wired communication path such as an electrical wire and an optical fibers, or a wireless communication path.

Steps describing the program recorded in a recording medium include not only processes that are performed chronologically in that order but also processes that are not necessarily performed chronologically but are executed in parallel or individually.

In other words, the safety vision device and safety vision system of the present disclosure can take many different embodiments having the following configurations.

(1) A safety vision device 20 of the present disclosure includes: a human three-dimensional skeleton estimation model 231 receiving input of a two-dimensional image of a human, and outputting three-dimensional joint point data indicating three-dimensional coordinate values of positions of joint points of the human; a robot three-dimensional skeleton estimation model 232 receiving input of a two-dimensional image of a robot 10, and a distance and a tilt between a camera 40 that has captured the two-dimensional image of the robot 10 and the robot 10, and outputting angles of a plurality of joint axes J1 to J6 included in the robot 10; an input unit 213 configured to input a two-dimensional image of a worker U and the robot 10 captured by the external camera 40, and a distance and a tilt between the external camera 40 and the robot 10; an estimation unit 214 configured to input the two-dimensional image, and the distance and tilt between the external camera 40 and the robot 10, which have been inputted by the input unit 213, to the human three-dimensional skeleton estimation model 231 and the robot three-dimensional skeleton estimation model 232 to estimate three-dimensional joint point data indicating three-dimensional coordinate values of positions of joint points of the worker U and the angles of the plurality of joint axes J1 to J6 included in the robot 10; and an approach determination unit 215 configured to calculate an area indicating a range of the worker U and areas R1 and R2 indicating a range of the robot 10, based on the three-dimensional joint point data and the angles of the plurality of joint axes J1 to J6, and outputting an instruction to decelerate or stop the robot 10 according to a degree of overlap between the area of the worker U and the areas R1, R2 of the robot 10 that have been calculated.

According to this safety vision device 20, it is possible to, when a worker enters the motion area of a robot, cause the robot to decelerate or stop without using an area sensor.

(2) In the safety vision device 20 according to (1), the two-dimensional image may be a frame image captured by the camera 40 at a predetermined frame rate.

By doing so, the safety vision device 20 can continuously track motions of the worker U and the robot 10.

(3) The safety vision device 20 according to (1) or (2) may further include a notification unit 216 configured to output a warning sound when the approach determination unit 215 outputs the deceleration or stop instruction.

By doing so, the safety vision device 20 can give a warning to the worker U.

(4) In the safety vision device 20 according to any of (1) to (3), the human three-dimensional skeleton estimation model 231 and the robot three-dimensional skeleton estimation model 232 may be provided in a server 50 connected to be accessible from the safety vision device 20 via a network 60.

By doing so, the safety vision device 20 can apply a trained model even when a new robot and a new safety vision device are arranged.

(5) A safety vision system 1 of the present disclosure includes the robot 10, the camera 40 and the safety vision device 20 according to any of (1) to (4).

This safety vision system 1 have effects similar to (1) to (4).

EXPLANATION OF REFERENCE NUMERALS

1 Safety vision system
10 Robot
20 Safety vision device
21 Control unit
211 Three-dimensional object recognition unit
212 Self-position estimation unit
213 Input unit
214 Estimation unit
215 Approach determination unit
216 Notification unit
22 Communication unit
23 Storage unit
231 Human three-dimensional skeleton estimation model
232 Robot three-dimensional skeleton estimation model
2321 Two-dimensional skeleton estimation model
2322 Joint angle estimation model
30 Machine learning device
301 Information acquisition unit
302 Two-dimensional posture acquisition unit
303 Input data acquisition unit
304 Label acquisition unit
305 Learning unit
306 Storage unit
40 Camera
50 Server
60 Network

The invention claimed is:

1. A safety vision device comprising:
a human three-dimensional skeleton estimation model as a learned model based on a supervised learning receiving input of a two-dimensional image of a human, and outputting three-dimensional joint point data indicating three-dimensional coordinate values of positions of joint points of the human;
a two-dimensional skeleton estimation model as a learned model based on a supervised learning receiving input of a two-dimensional image of a robot captured by a camera and outputting a two-dimensional posture of pixel coordinates indicating positions of the centers of the joint axes of the robot in the two-dimensional image when the two-dimensional image is captured;
a robot three-dimensional skeleton estimation model as a learned model based on a supervised learning receiving input of the two-dimensional posture of pixel coordinates of the robot, and a distance and a tilt between the camera that has captured the two-dimensional image of the robot and the robot, and outputting angles of a plurality of joint axes included in the robot;
an input unit configured to input a two-dimensional image of a worker and the robot captured by an external camera, and a distance and a tilt between the external camera and the robot;
an estimation unit configured to input the two-dimensional image of the worker which have been inputted by the input unit to the human three-dimensional skeleton estimation model and estimate the three-dimensional joint point data indicating three-dimensional coordinate values of positions of joint points of the worker,
the estimation unit further configured to input the two-dimensional image of a robot captured by the camera to the two-dimensional skeleton estimation model and estimate a two-dimensional posture of pixel coordinates indicating positions of the centers of the joint axes of the robot in the two-dimensional image,
the estimation unit further configured to input the distance and tilt between the external camera and the robot, which have been inputted by the input unit, and the two-dimensional posture of pixel coordinates indicating positions of the centers of the joint axes of the robot to the robot three-dimensional skeleton estimation model, and estimate the angles of the plurality of joint axes included in the robot; and
an approach determination unit configured to calculate an area indicating a range of the worker by adding a shape having a length, depth, and height set in advance for each straight line of the skeleton generated based on the three-dimensional joint point data of the worker, and an area indicating a range of the robot by adding a shape having a length, depth, and height set in advance to each link of the skeleton generated based on the three-dimensional joint point data and the angles of the plurality of joint axes,
and output an instruction to decelerate or stop the robot according to a degree of overlap between the calculated areas of the worker and the robot.

2. The safety vision device according to claim 1, wherein the two-dimensional image is a frame image captured by the camera at a predetermined frame rate.

3. The safety vision device according to claim 1, further comprising a notification unit configured to output a warning sound when the approach determination unit outputs the deceleration or stop instruction.

4. The safety vision device according to claim 1, wherein the human three-dimensional skeleton estimation model and the robot three-dimensional skeleton estimation model are provided in a server connected to be accessible from the safety vision device via a network.

5. A safety vision system comprising:
a robot;
a camera; and
the safety vision device according to claim 1.

* * * * *